July 29, 1952  H. MEYER  2,604,703

INTERNAL MICROMETER CALIPER

Filed Feb. 25, 1948

Inventor:
H. Meyer

Patented July 29, 1952

2,604,703

UNITED STATES PATENT OFFICE 2,604,703

INTERNAL MICROMETER CALIPER

Hans Meyer, Renens, Switzerland, assignor, by mesne assignments, to Brown & Sharpe Manufacturing Company, Providence, R. I., a corporation of Rhode Island Application February 25, 1948, Serial No. 10,764
In Switzerland October 11, 1943

8 Claims. (Cl. 33—178)

My invention relates to improvements in internal micrometer calipers, in which the measuring spindle is provided with a threaded cone head for displacing a series of spring-loaded contact elements at right angles thereto; and the main object of my improvement is to provide an instrument of simple construction for measuring the width of bores, apertures, and the distance between plates and the like.

I attain this and related objects by the instrument shown, in various adaptations, in the accompanying drawings, in which—

Figure 1:
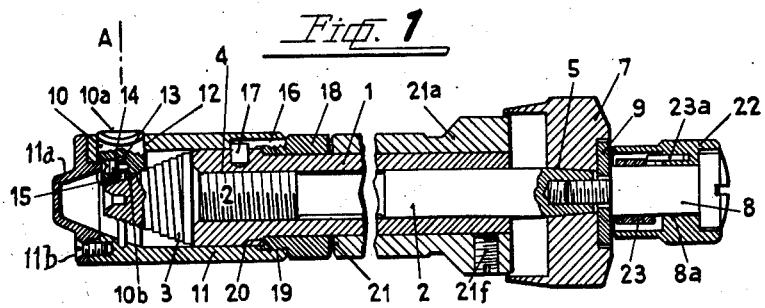
Figure 2:
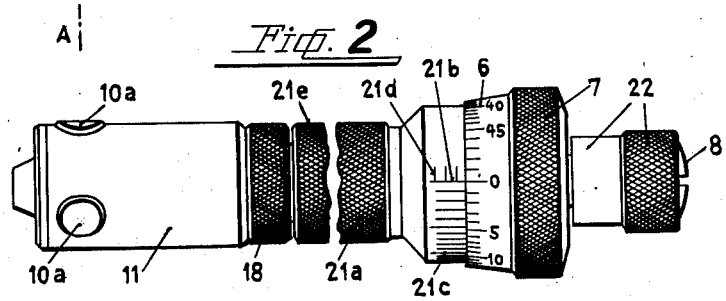
Figure 3:
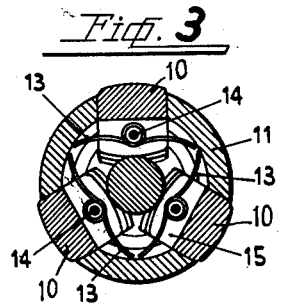
Figure 4:
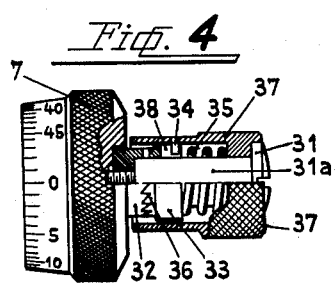
Figure 5:
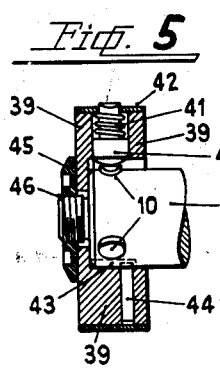
Figure 6:
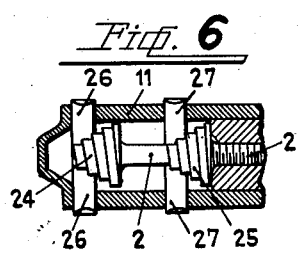
Figure 7:
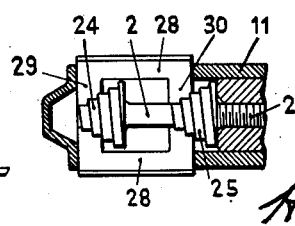

Fig. 1 is a fragmentary longitudinal section through a preferred form of invention, Fig. 2 is a fragmentary elevation of the same, Fig. 3 is a cross-section on the line A—A of Fig. 1, Fig. 4 is a view, partly in section, of a second form of ratchet stop for the measuring spindle, Fig. 5 is a cross-section, taken on the axis of the instrument, of an auxiliary extension contact structure plugged over the instrument head, and Figs. 6 and 7 are fragmentary longitudinal sections of the instrument head provided with sets of contact elements disposed in line.

The instrument according to Fig. 1 comprises the following parts:

The measuring spindle 2 is threaded in the guide sleeve 1 by means of the micrometer threads 4, and is provided at its head with a threaded cone end 3. The tapered outer end 5 of the said measuring spindle 2 projects from the said sleeve 1 and is rigidly secured to the thimble 7 by means of the screw 8 and the washer 9. The thimble 7 serves as drive element for the spindle 2 and its cone head 3, and is provided with a circular scale of graduations 6.

In the form of invention shown there are three contact buttons 10 circumferentially disposed at equal distances in bores 12 of a retainer sleeve 11, in which they are radially displaceable. The sleeve 11 is telescoped over and secured to the guide sleeve 1, and it is closed at its inner end by a domed cap 11a which is secured to the sleeve 11 by screws 11b. The base portions of the contact buttons 10 are tapered and of concave shape and provided with threads 10b for engaging the threaded cone 3, while their head portions 10a are cylindrical and of convex shape concentric with the sleeve 11. Three wing springs 13 (Fig. 3), secured to screws 14 and housed in slots 15 of the contact buttons 10 yieldingly urge the latter lightly inwardly against the positive spreading action of the propelling cone 3. The springs 13, therefore, also guarantee a proper engagement of the corresponding threads on the contact buttons 10b and the cone 3.

In order to secure the sleeve 11 on the guide sleeve 1 against any rotative displacement relative to the latter, the sleeve 11 is provided with a groove 16 which is engaged by a key 17 disposed on the sleeve 1. The sleeve 11, furthermore, is secured longitudinally by a ring 18 having a reduced diameter inner end threaded into internal threads 19 at the outer end of the sleeve 11 to seat against a radial shoulder of the guide sleeve 1. The ring 18 is secured against axial displacement in the opposite direction by the radial shoulder 21 of a hub 21a which is anchored to the sleeve 1 by a set screw 21f.

The thimble 7, together with the measuring spindle 2, is rotated by means of the ratchet stop secured to its outer end. The ratchet stop serves to maintain an approximately equal measuring pressure on the contact buttons 10, and comprises the shouldered shank 8a of the screw 8, a helical spring 23 disposed on the said shank, and a turning knob 22 which is provided with an axial slot for receiving the end 23a of the said spring 23. The spring 23, due to its own friction, grips the shank 8a. When turning the knob 22 clockwise—as seen from the outer or turning knob end of the instrument— the spring 23 slackens on account of the torque to be overcome in the measuring operation, and the contact buttons 10 are spread apart. When the said torque has attained a certain value, corresponding to the measuring pressure desired, the spring 23 starts to slip on the screw shank 8a, and becomes disengaged from the thimble 7. At this moment, therefore, the measuring spindle 2 comes to rest, and the friction in the threads 10b and 4 maintains a constant measuring pressure on the walls of the bore to be measured. Upon turning the knob 22 counterclockwise, the frictional pressure of the spring 23 upon the shank 8a is increased, and the thimble 7 becomes coupled to the knob 22.

In order to be able to read fractions of an interval of the circular scale of graduations 6 with reference to the marking line 21b, the hub 21a is provided with a vernier scale 21c. The full revolutions of the thimble 7 upon the hub 21a and, therefore, also on the sleeve 1, are read from the lineal divisions 21d. The hub 21a is provided with a knurled surface 21e for manipulating purposes.

The retainer sleeve 11 is secured to the guide sleeve 1 to form a housing for the spindle 2, the threaded cone 3 and the contact buttons or feeler members 10, and the elements 16—21a serve only for mounting and demounting purposes. The connection between the sleeves 11 and 1 also could be effected by means of latches or pawls. Again, the sleeve 11 could be made an integral part of sleeve 1, or the latter could be adapted as a retainer sleeve.

The instrument shown in Figs. 1 and 2 could be constructed in part to differ from the form shown, without, however, departing from the scope of the present invention.

Among these structural variations I refer to the following:

The cylindrical surface of the head 10a of the contact buttons 10 assures a lineal contact between the latter and the wall of the bore to be measured, and the said buttons thus are aligned accurately at right angles to the said wall. The surface of the head 10a also, of course, could be shaped differently; they, e. g., could be spherically adapted, or given a shape which permits of measuring inside threads and the like. To prevent too quick a wear of the surface 10a, the latter can be chromium-plated or given a coat of some hard metal.

The spiral threads on the cone 3, as to form, pitch, and taper, may be adapted to the purpose of the measuring instrument at hand. Suitably, a thread is chosen, the one flank of which runs parallel to the cone axis, while the other extends at right angles thereto.

In view of the simple design of the structure, the instrument suitably is equipped with only one threaded cone. There may be, however, two or more threaded cones provided on the measuring spindle; in which case the contact elements either may be so disposed that each cone actuates a separate set of contact elements, or so that each of the latter engages each cone. In Figs. 6 and 7 two of these possible dispositions are shown diagrammatically. In the example shown in Fig. 6, each of the cones 24 and 25 cooperates with a set 26 and 27 of contact elements; the two sets being independent of each other.

In the example shown in Fig. 7, there is only one set of contact elements 28 which each engage both cones 24 and 25 by their corresponding legs 29 and 30. The other elements of the instrument may be analogous to those shown in Figs. 1 and 2.

In the form shown in Fig. 1, the threaded cone 3 is made integral with the measuring spindle 2; it, however, also may be loosely connected to the latter, in which case measures must be taken to prevent a rotation of the spindle relative to the cone 3.

The measuring spindle 2, guided and journalled in the sleeve 1, engages and is displaced axially by the threads 4 of the latter. The threads of the cone 3 have the same pitch as the threads 4 which effect the displacement of the spindle 2; and cone 3, therefore, is in the proper position in each measuring setting.

In place of the ratchet stop device shown in Figs. 1 and 2, for actuating the thimble 7, another form of ratchet stop—as shown in Fig. 4—may be employed. A ratchet wheel 32 is rigidly connected to the thimble 7 by the screw 31. A ring pawl 33, sliding upon the wide shank 31a of the screw 31, is pushed against the ratchet wheel 32 by the helical spring 35. When turning the knob 37, the ratchet wheel 33 is turned also, since the latter is provided with a keyway 38 which is engaged by a pin 34 rigidly secured to the said knob 37. The teeth 36 are adapted so as to become disengaged, upon turning the knob 37 clockwise, as soon as the preselected maximum torque has been attained; and to effect a fast coupling between thimble 7 and knob 37 upon turning the latter counterclockwise.

In order to extend the measuring range of the instrument, the possibility of increasing the diameter range of the contact buttons 10 has been provided for. Fig. 5 shows such an example of execution, in which an additional contact sleeve, containing auxiliary contact buttons, is plugged over the base retainer sleeve 11.

In this last form, the superimposed sleeve 39 comprises contact button extensions 40 corresponding in number and disposition to the contact buttons 10 in the retainer sleeve 11. These contact elements 40 are pressed against the buttons 10 by the springs 41 which bear against the retainer 42. A pin 44, secured to the sleeve 39, engages the slot 43 in the sleeve 11 and prevents thus a rotation of the sleeve 39. The latter is secured against axial displacement on the sleeve 11 by the cap nut 45 screwed onto the threads 46 in the head of the sleeve 11. Obviously there are also other ways of fastening sleeve 39 to sleeve 11 possible.

The instrument shown and described is used as follows:

The retainer sleeve 11 is introduced into the bore to be measured with the cone 3 in the position shown in Fig. 1. By turning the knob 22, the thimble 7 and thus also the cone 3 is screwed forward until the spreading contact buttons 10 contact the wall of the bore under a certain predetermined pressure, i. e. the measuring pressure set by the friction of the spring 23 on the shank 8a of Fig. 1. After this pressure has been surpassed, the friction coupling of the ratchet stop becomes disengaged from the spindle 2 and the cone 3. The bore diameter now may be read off the reference mark 21b on the scales 21d and 6 of the hub 21a (Fig. 2). The thimble 7 then is screwed backward of the hub 21a by means of the knob 22, upon which the contact buttons are withdrawn into the sleeve 11 under the action of the springs 13; and the sleeve 11 may be withdrawn from the bore.

I am aware that prior to my invention inside micrometer calipers have been designed in which one or more contact elements were disposed radially of and had inner conical surfaces seated upon a cone which was displaced axially by a driving element, whereby the contact elements were displaced at right angles to the axial displacement of the cone. I, therefore, do not claim such a combination broadly; but

What I claim and desire to secure by Letters Patent is:

1. An internal micrometer caliper comprising a measuring spindle, at least one threaded cone coupled to the measuring spindle, and at least one contact element in positive engagement with the said threaded cone and radially displaceable thereby relative to the axis of said spindle.

2. An internal micrometer caliper as defined in claim 1, comprising a driving element secured to said measuring spindle and having fixed thereto a graduated thimble, and a guide sleeve in which said measuring spindle is threaded for axial displacement on rotation of said spindle with respect to said guide sleeve, the pitch of the threaded connection of said spindle and said guide sleeve being identical with the pitch of the threads of said cone.

3. An internal micrometer caliper, comprising a measuring spindle, a ratchet stop-and-thimble drive therefor, a hub enclosing a threaded sleeve for guiding the said spindle, two threaded cones disposed in line with and fastly secured to one end of the said spindle, and a plurality of spring-loaded contact elements in positive engagement with the said threaded cones and displaceable at right angles thereto.

4. An internal micrometer caliper as defined in claim 3, wherein said plurality of contact elements comprises two sets of contact elements of which each set co-operates with a different one of the said threaded cones.

5. An internal micrometer caliper as defined in claim 3, wherein said plurality of contact elements comprises a set of contact elements each co-operating with both said threaded cones.

6. An internal micrometer caliper comprising a guide sleeve having an internally threaded portion, a measuring spindle supported by said guide sleeve for rotation about its axis and for longitudinal displacement, said spindle having threads engaged with said internally threaded portion of said guide sleeve, a threaded cone carried by said spindle, the pitches of the threads of said cone and of said spindle being equal, a plurality of feeler elements spaced circumferentially around said threaded cone and having inner threaded ends seated upon said cone, spring means yieldingly retaining said feeler elements in engagement with said threaded cone, and scale means including a longitudinal scale corresponding to unit rotations of said measuring spindle and a circumferential scale on a thimble secured to said measuring spindle.

7. In an internal micrometer caliper, the invention as recited in claim 6, wherein one flank of the thread of said cone is parallel to the axis of said measuring spindle and the other flank is normal thereto.

8. In an internal micrometer caliper, the invention as recited in claim 6, wherein a retainer sleeve is connected to said guide sleeve and provided with circumferentially spaced apertures in which said feeler elements are guided for movement radially of the axis of said spindle and threaded cone.

HANS MEYER.

REFERENCES CITED

The following references are of record in the file of this patent:

UNITED STATES PATENTS

| Number | Name | Date |
|---|---|---|
| 528,759 | Bernhardt | Nov. 6, 1894 |
| 647,910 | Starrett | Apr. 17, 1900 |
| 1,429,556 | Bartholdy | Sept. 19, 1922 |
| 1,660,469 | Bath | Feb. 28, 1928 |
| 1,760,717 | Peglow | May 27, 1930 |
| 1,904,143 | Koos | Apr. 18, 1933 |
| 2,059,141 | Pillischafske | Oct. 27, 1936 |
| 2,361,336 | Volis | Oct. 24, 1944 |

FOREIGN PATENTS

| Number | Country | Date |
|---|---|---|
| 89,073 | Switzerland | May 2, 1921 |
| 223,716 | Switzerland | Dec. 16, 1942 |
| 249,155 | Switzerland | Mar. 16, 1948 |